United States Patent
Eagland et al.

(10) Patent No.: US 6,660,802 B2
(45) Date of Patent: Dec. 9, 2003

(54) POLYMERIC MATERIAL

(76) Inventors: Donald Eagland, 21 Clough Drive, Clough Park, Lepton, West Yorkshire, Huddersfield (GB), HD8 OJJ; Nicholas John Crowther, 12 Beech Drive, Denholme, Bradford, West Yorkshire (GB), BD13 4LU ( * ) Notice: Subject to any disclaimer, the term of this patent is extended or adjusted under 35 U.S.C. 154(b) by 141 days.

(21) Appl. No.: 09/820,038

(22) Filed: Mar. 28, 2001

(65) Prior Publication Data

US 2002/0128374 A1 Sep. 12, 2002

Related U.S. Application Data

(62) Division of application No. 09/269,095, filed on Jun. 7, 1999, now abandoned.

(51) Int. Cl.[7] .......................... C08F 2/48; C08F 112/32; C08F 116/14; C08F 116/34; C08F 126/06
(52) U.S. Cl. .......................... 524/804; 522/6; 524/808; 524/818; 526/263; 526/265; 526/313; 526/315
(58) Field of Search ................................ 524/804, 818, 524/808; 522/6; 526/263, 265, 313, 315

(56) References Cited

U.S. PATENT DOCUMENTS

| | | | |
|---|---|---|---|
| 4,039,542 A | | 8/1977 | Panzer et al. |
| 4,276,362 A | * | 6/1981 | Harney ........................ 429/213 |
| 4,287,335 A | * | 9/1981 | Ichimura ..................... 546/152 |
| 4,709,767 A | | 12/1987 | Alexander |
| 5,258,473 A | | 11/1993 | Niessner et al. |

FOREIGN PATENT DOCUMENTS

| | | |
|---|---|---|
| EP | 0 244 835 | 11/1987 |
| EP | 0 393 578 | 10/1990 |
| GB | 1211193 | 11/1970 |
| GB | 1 333 275 | 10/1973 |
| GB | 2 030 575 | 4/1980 |

OTHER PUBLICATIONS

Li et al. (Photodimerization of 4'–formyl–4–stilbazole compounds in solid media, Ganguang Kexue Yu Guang Huaxue, (1994), 12(1), 51–57).*

Polymeric Materials Encyclopedia, 1996 pp. 4287–4294; Micelle–Forming Monomers, Photopolymerization by F. Candau and R. Zana.

Polymer, 1987, vol. 28, pp. 332–339; Novel Quaternary Ammonium Amphiphilic (meth) Acrylates: 2. Thermally and Photochemically Initiated Polymerizations by S.M. Hamid and D.C. Sherrington.

Polymeric Encyclopedia, 1996, pp. 2928–2934; Head–to–Head Polymers by Stephen F. Hahn.

Li et al., Photodimerization of 4'–formyl–4stilbazole compounds in solid media, Ganguang Kexue Yu Guang Huaxue, (Feb. 1994), 12(1), pp. 51–57.

* cited by examiner

Primary Examiner—Kelechi Egwim
(74) Attorney, Agent, or Firm—Calfee, Halter & Griswold LLP

(57) ABSTRACT

A method of preparing a first polymeric compound which comprises providing a compound of the general formula $AR_1C=CR_2B$ or a salt thereof where A and B are the same or different and at least on group comprises a relatively polar atom or group and $R_1$ and $R_2$ independently comprise relatively non-polar atoms or groups, in a solvent of a type in which ethane itself is greatly insoluble and spacing the C=C groups in said compound to react with one another to form a polymeric structure. The first polymeric compound may be reacted with a second compound, for example polyvinylalcohol, collagen, or the like to produce a colloid or gel which may have applications in the treatment of burns or recovery of oils.

12 Claims, 7 Drawing Sheets

POLYMERIC MATERIAL

CROSS-REFERENCE TO RELATED APPLICATIONS

This application is a divisional of U.S. patent application Ser. No. 09/269,095, filed Jun. 7, 1999, now abandoned.

This invention relates to a polymeric material and particularly, although not exclusively, relates to a polymeric material which is at least partially formed from a 1,2-substituted ethene compound, for example a substituted styrylpyridinium compound.

UK Patent No. GB 2 030 575 B (Agency of Science and Technology) describes a photosensitive resin which is prepared by reacting a styryl pyridinium salt which possesses a formyl or acetal group on the styryl phenyl group with a polyvinyl alcohol or a partially saponified polyvinyl acetate. In the resin, the group —CH═CH— is photosensitive and, accordingly, the resin can be used in, for example, screen printing where it is found to exhibit high sensitivity.

The present invention is based on the discovery of surprising properties of 1,2-substituted ethene compounds of the type described which allow polymeric materials to be prepared which have various useful properties.

According to a first aspect of the present invention, there is provided a method of preparing a first polymeric compound which comprises providing a compound of general formula:

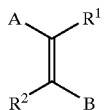

I or a salt thereof where A and B are the same or different and at least one comprises a relatively polar atom or group and $R^1$ and $R^2$ independently comprise relatively non-polar atoms or groups, in a solvent of a type in which ethene itself is generally insoluble and causing the groups C═C in said compound to react with one another to form a polymeric structure.

Preferably, $R^1$ and $R^2$ are independently selected from a hydrogen atom or an optionally substituted, preferably unsubstituted, alkyl group. Preferably, $R^1$ and $R^2$ represent the same atom or group. Preferably, $R^1$ and $R^2$ represent a hydrogen atom.

Preferably, said solvent is a polar solvent. Preferably said solvent is an aqueous solvent. More preferably, said solvent consists essentially of water.

Preferably, said compound of general formula I is provided in said solvent at a concentration at which molecules of said compound aggregate. Aggregation of said compound of general formula I may be shown or inferred from the results of various analyses as hereinafter described and any one or more of such analyses may be used. Preferably, said compound of general formula I is provided in said solvent at or above a concentration suggested by relevant vapour pressure measurements as being a point of aggregation of the compound.

It is believed that said molecules of compound I form aggregates or micelles in the solvent, with the C═C bonds aligned with one another so that the molecules effectively align substantially parallel to one another.

Preferably, the molecules align with groups A and B adjacent to one another.

Said compound of general formula I may be provided in said solvent at a concentration of at least 0.5 wt %, preferably at least 1.0 wt % and, more preferably, at least 1.5 wt %.

The groups C═C in said compound are preferably caused to react in a photochemical reaction. Preferably, the method comprises inducing a photochemical reaction, suitably using ultraviolet light. Preferably, in the method, light of up to 500 nm wavelength is used.

Preferably, A and B are independently selected from optionally-substitute alkyl, cycloalkyl, cycloalkenyl, cycloalkynyl, aromatic and heteroaromatic groups. Where group A or B has a cyclic structure, five or, more preferably, six membered rings are preferred.

More preferably, A and B are independently selected from optionally substituted aromatic and heteroaromatic groups, with five or, more preferably, six-membered such groups being especially preferred. Preferred heteroatoms of said heteroaromatic groups include nitrogen, oxygen and sulphur atoms of which oxygen and especially nitrogen, are preferred. Preferred heteroaromatic groups include only one heteroatom. Preferably, a or said heteroatom is positioned furthest away form the position of attachment of the heteroaromatic group to the group C═C. For example, where the heteroaromatic group comprises a six-membered ring, the heteroatom is preferably provided at the 4-position relative to the position of the bond of the ring with the group C═C.

Unless otherwise stated, optionally substituted groups described herein, for example groups A and B, may be substituted by halogen atoms, and optionally substituted alkyl, acyl, acetal, hemiacetal, acetalalkyloxy, hemiacetalalkyloxy, nitro, cyano, alkoxy, hydroxy, amino, alkylamino, sulphinyl, alkylsulphinyl, sulphonyl, alkylsulphonyl, sulphonate, amido, alkylamido, alkylcarbonyl, alkoxycarbonyl, halocarbonyl and haloalkyl groups. Preferably, up to 3, more preferably up to 1 optional substituents may be provided on an optionally substituted group.

Unless otherwise stated, a alkyl group may have up to 10, preferably up to 6, more preferably up to 4 carbon atoms, with methyl and ethyl groups being especially preferred.

Preferably, A and B each represent polar atoms or groups. Preferably, A and B each represent optionally-substituted aromatic or heteroaromatic groups wherein the "p" orbital of the aromatic groups are aligned with those of the group C═C. Preferably, A and B represent different atoms or groups.

Preferably, one of the groups A and B includes an optional substituent which includes a carbonyl or acetal group with a formyl group being especially preferred. The other one of groups A and B may include an optional substituent which is an alkyl group, with an optionally substituted, preferably unsubstituted, $C_{1-4}$ alkyl group, for example a methyl group, being especially preferred.

Preferably, group A represents a phenyl group substituted, preferably at the 4-position relative to the group C═C, by a formyl group or a group of general formula:

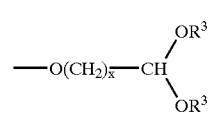

II where X is an integer from 1 to 6 and each $R_3$ is independently an alkyl or phenyl group or together form an alkalene group.

Preferably, group B represents a group of general formula:

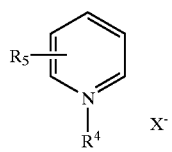
III wherein $R^1$ represents a hydrogen atom or an alkyl or aralkyl group, $R^5$ represents a hydrogen atom or an alkyl group and $X^-$ represents a strongly acidic ion.

Preferred compounds of general formula I for use according to the present invention include those referred to on page 3 line 8 to line 39 of GB 2 030 575 B and said compounds are hereby incorporated into this specification.

Compounds of general formula I for use according to the present invention may be prepared as described in GB 2 030 575 B and such preparatory methods are also hereby incorporated into this specification.

The invention extends to a novel first polymeric compound preparable by a method according to said first aspect.

According to a second aspect of the present invention, there is provided a novel first polymeric compound having the formula:

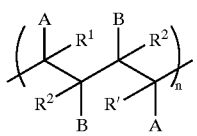
IV wherein A, B, $R^1$ and $R^3$ are as described in any statement herein and n is an integer.

According to a third aspect of the present invention, there is provided a method of preparing a formulation comprising providing a first polymeric compound according to said first or second aspects in a solvent together with a second polymeric compound and intimately mixing the compounds.

Preferably, said second polymeric compound includes one or more functional groups capable of reacting with said first polymeric compound, preferably in an acid catalysed reaction. Said reaction is preferably a condensation reaction. Preferably, said second polymeric compound includes a functional group selected from an alcohol, carboxylic acid, carboxylic acid derivative, for example an ester, and a amine group. Preferred second polymeric compounds include optionally substituted, preferably unsubstituted, polyvinylalcohol, polyvinylacetate, polyalkylene glycols, for example polypropylene glycol, and collagen (and any component thereof).

Preferably, said second polymeric compound is a solid under ambient conditions. Preferably, said intimate mixing is carried out at an elevated temperature. Preferably, mixing is carried out in the same solvent in which compound I is prepared. The mixture may include further polymeric compounds which may be the same type as said second polymeric compounds described above.

The ratio of the wt % of said first polymeric compound to the wt % of said second polymeric compound (or the sum of the wt % of the second compound and any further compounds) in the mixture is found to influence significantly the properties of the formulation prepared. The ratio of the wt % of said first polymeric compound to that of said second polymeric compound may be in the range 0.01 to 100, is preferably in the range 0.05 to 50 and more preferably in the range 0.3 to 20.

Preferably, water is removed from said formulation to produce a solid material, for example in the form of a film.

According to a fourth aspect of the present invention, there is provided a formulation comprising a first polymeric compound according to said first or second aspects and a second polymeric compound as described in said third aspect.

Preferably, said formulation is provided in a solid form.

According to a fifth aspect of the present invention, there is provided a method of preparing a material, for example a colloid or a gel comprising providing a mixture prepared in said third aspect or a mixture according to said fourth aspect in a solvent and causing the first and second polymeric compounds to react with one another.

The reaction may be acid catalysed and, accordingly, the method may include the step of providing an acid in the mixture. It is found that the concentration of acid used affects the rate of colloid/gel production. Preferably, at least 0.05 wt %, more preferably at least 0.1% of an acid is used. Any acid may be used whether organic or inorganic. Preferred acid include paratoluene sulphonic acid, hydrochloric acid, phosphoric acid, sulphonic and napthalene sulphuric acids.

The concentration of the mixture used affects whether a colloid or gel forms. Where the wt % of a said solid formulation of said first and second polymeric compound is less than about 2 wt %, a visco-elastic colloidal solution is formed. On the other hand, where the concentration is greater than about 2 wt %, a gel may be formed.

A further active ingredient may be incorporated into the colloid or gel prepared as described in said fifth aspect, suitably by addition of said active ingredient prior to the reaction of the first and second polymeric compounds. Preferred active ingredients include antibacterial agents, for example an iodine/iodide mixture, cetyl trimethyl ammonium bromide and neomycin sulphate. Sheet materials may be prepared incorporating active ingredients and since it is understood that preparations prepared as described herein are biocompatible, the sheet materials may be used in burns treatment.

It has been noted that if oil (or the like) is contacted with the reaction mixture of said fifth aspect, up to 50 wt % of oil can be emulsified by the mixture and that the resultant gel holds the oil in a solid matrix. Accordingly, in a sixth aspect, the invention provides a method of collecting and/or isolating and/or emulsifying oil (or the like) which comprises contacting oil (or the like) with a reaction mixture according to said fifth aspect so that said oil (or the like) becomes incorporated into a material, for example a gel which is formed.

The invention extends to a colloid or gel preparable by the method of the fifth aspect.

According to a seventh aspect, there is provided a novel third polymeric material which comprises the reaction product of a compound of general formula IV with a second polymeric material as described herein.

Any feature of any aspect of any invention or example described herein may be combined with any feature of any aspect of any other invention or example described herein.

Specific embodiments of the invention will now be described, by way of example, with reference to the accompanying figures, wherein.

PHYSICO-CHEMICAL STUDIES OF

4-(4-FORMYLPHENYLETHENYL)-1-METHYLPYRIDINIUM METHOSULPHONATE (SbQ)

Studies

Various physico-chemical studies were undertaken on a sample of purified SbQ in an aqueous solution, as follows:
  i. Surface tension measurements—made using a drop profile measurement procedure.
  ii. Vapour pressure measurements—made using a Knauer vapour pressure osometer standardised against Analar NaCl solutions.
  iii. An analysis of the energy of the structure of the SbQ molecule, minimised in water—made using a Hyperchem (Trade Mark) molecular modelling package based on MM+ force field calculations
  iv. Conductivity measurements—made using a Wayne Kerr model B905 automatic measurement bridge.
  v. Density measurements—made as described in Eur. Polym. J., 1987, 23, 711 in order to provide apparent molar volume values.
  vi. Light scattering measurements—made using a Sofica photogoniometer model 42000 modified to use a Uniphase 1 mW HeNe laser, operating at 543 nm.
  vii. Heats of dilution measurements—made using a LKB Flow Microcalorimeter model 2107-121/127.

Results

Figure 1:
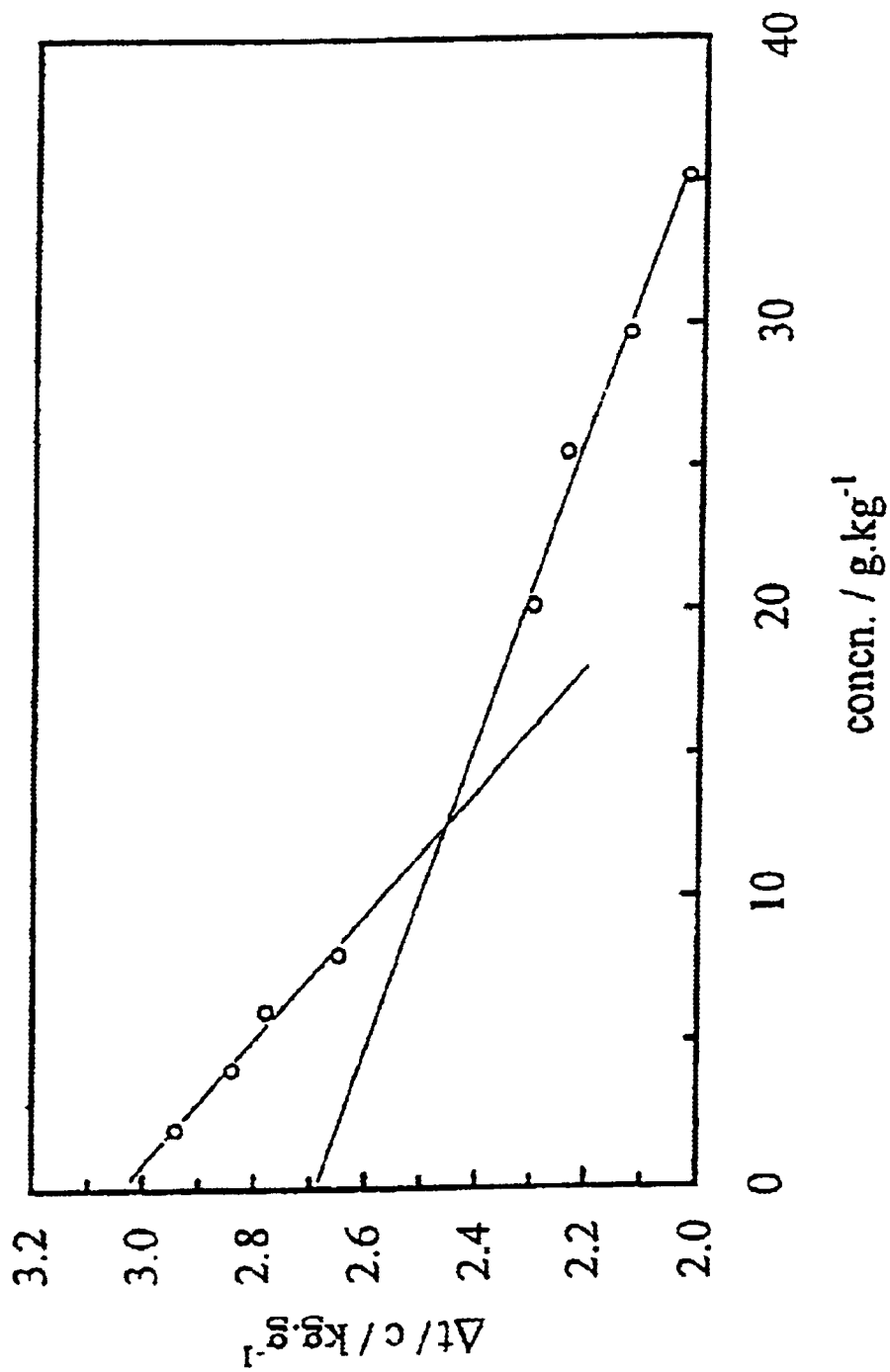
FIG. 1 is a graph showing vapour pressure measurements on aqueous solutions of 4-(4-formylphenylethenyl)-1-methylpyridinium methosulphonate (SbQ) at 37° C. as a function of concentration.

Referring to FIG. 1, the ratio $\Delta t/C$ represents the difference in temperature between the solvent reference probe and the solution probe at a concentration C in g/kg. The plot shows two linear regions, both with good correlation coefficients of 0.996 and 0.998 respectively, intersecting at a concentration value of 1.25% w/w. The intercept of the low range of solution concentrations was utilized in the usual manner to yield a value for the number average molar mass for SbQ of 341, close to the expected value of 335. The difference of slope at the higher concentrations suggests that, above the concentration of 1.25% w/w, some form of aggregation of SbQ molecules has occurred.

Figure 2:
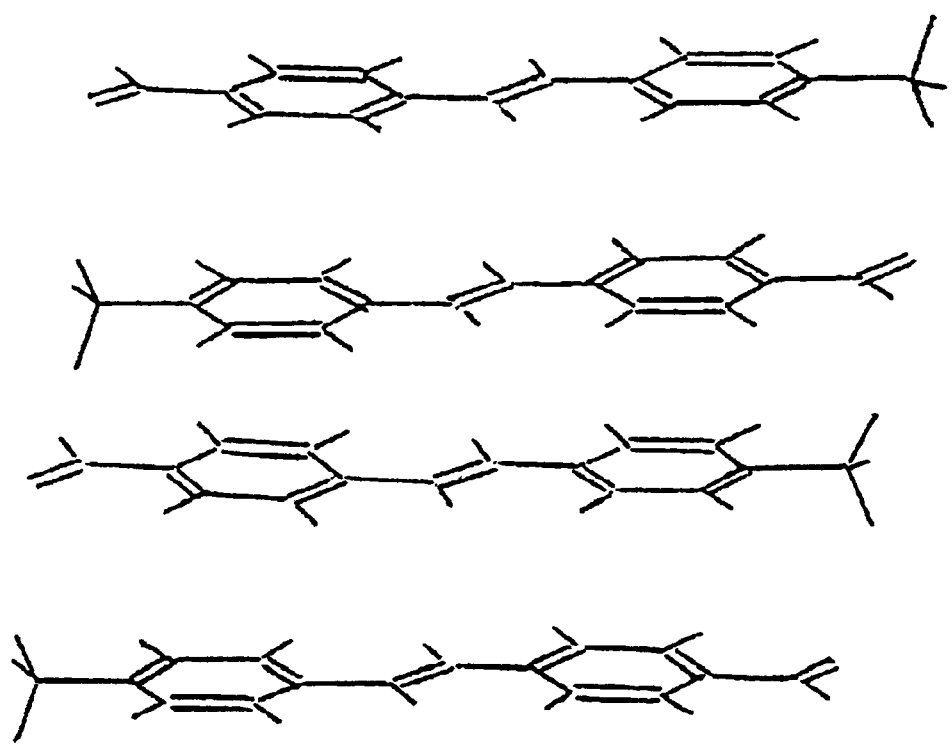
FIG. 2 is a representation of the predicted energy minimised structure of four SbQ molecules in water.

The analysis using the Hyperchem package predicts a very planar structure. Such a structure for the molecule easily allows for the possibility of stacking of the molecules with the hydrophobic regions one above the other and with the aldehyde and —N—$CH_3$ groups alternating, to produce an aggregate, shown energy minimised in water, for four SbQ molecules, in FIG. 2.

Taking the difference between the intercepts in FIG. 1 for the two concentration regions as being due to the aggregate, this yields a molar mass for the SbQ aggregate of about 2800, suggesting that the aggregate stack consists of about eight monomer units, with a critical concentration for the change of 1.25% w/w, or close to 0.04M.

Figure 3:
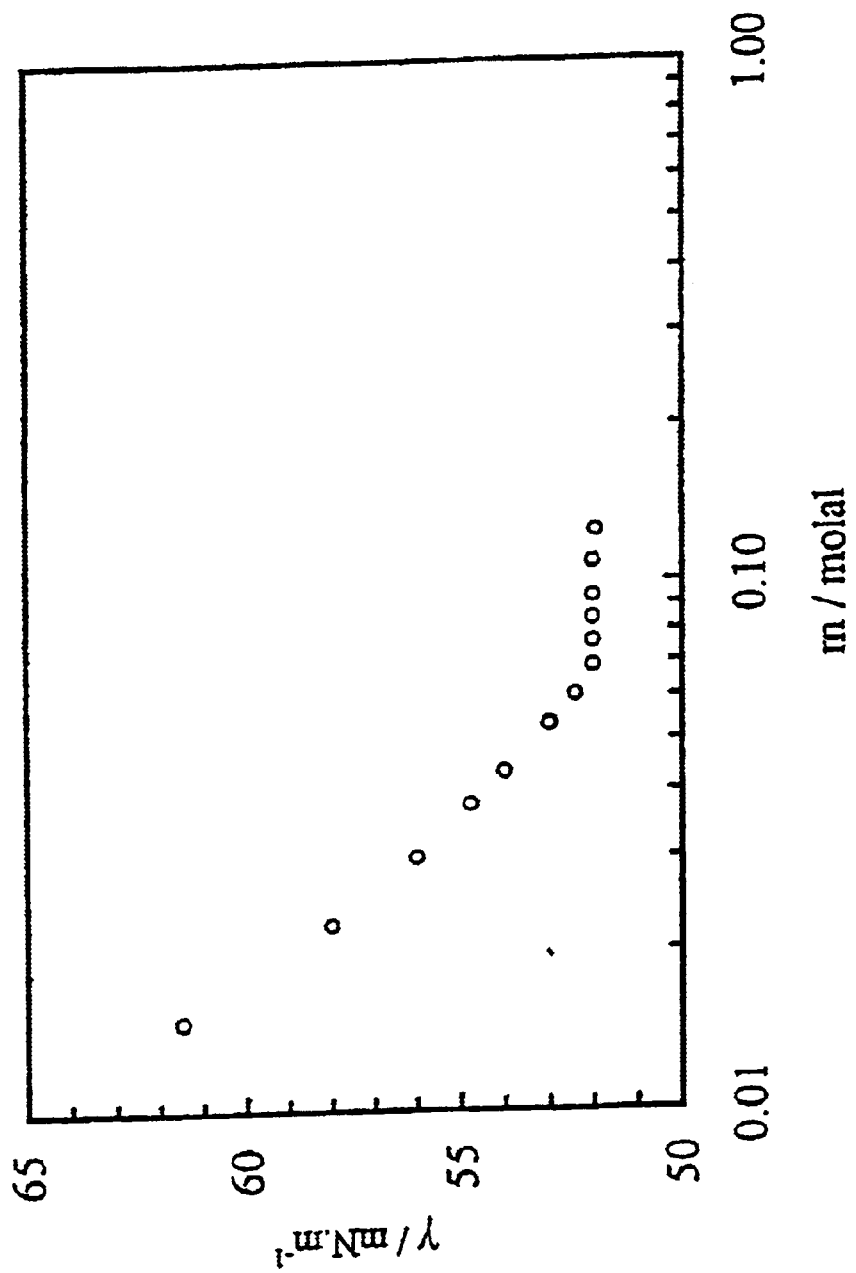
FIG. 3 is a graph showing surface tension measurements of SbQ solutions, at 25° C., as a function of concentration.

Referring to the surface tension measurements of FIG. 3, the pattern seen is the classic one for micellisation of a surfactant with the break occurring at about 0.06M. This evidence therefore suggests that the SbQ aggregate is in fact a stacked rod-like micelle, with a critical micelle concentration (cmc) value of 0.04 to 0.06M.

Figure 4:
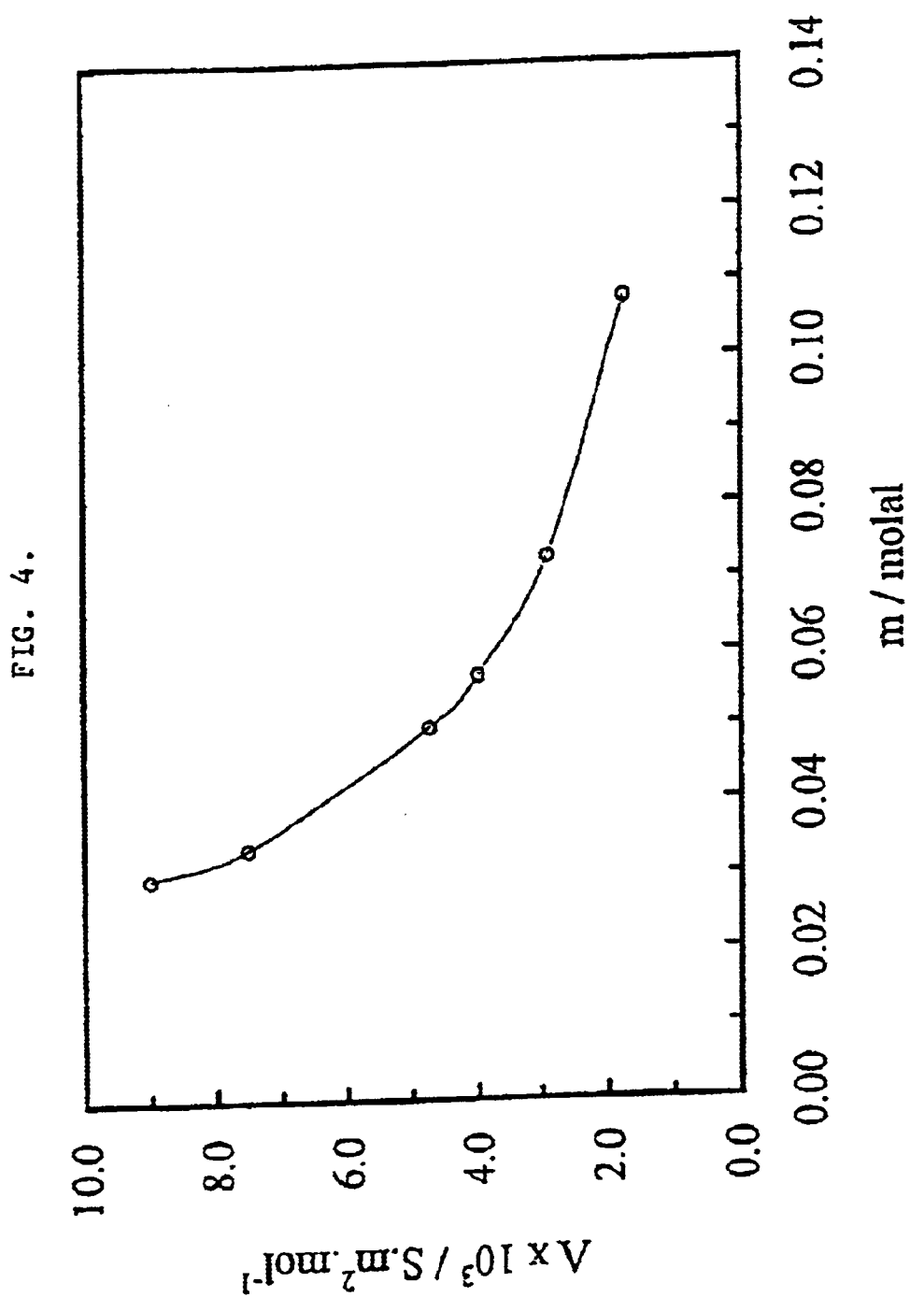
FIG. 4 is a graph showing molar conductance values of SbQ solutions, at 25° C., as a function of concentration.

The molar conductance values of FIG. 4 also show the pattern expected of a micellar forming species, with the change of slope at the cmc occurring at 0.04M.

Figure 5:
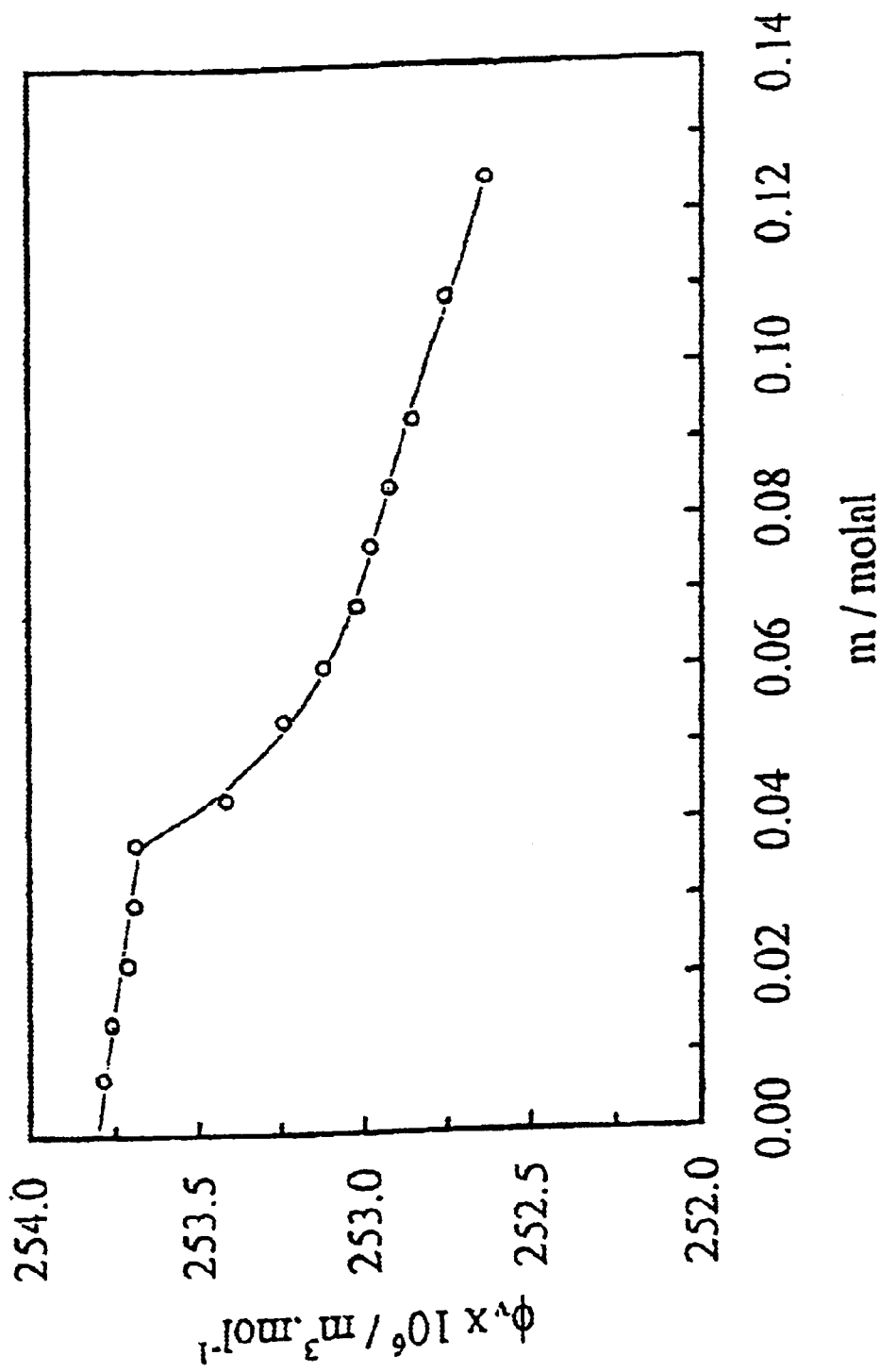
FIG. 5 is a graph showing apparent molar volume values of SbQ, at 25° C., as a function of concentration.

Referring to FIG. 5, the sharp change of slope seen at 0.04M means that the SbQ molecule adopts a more compact form above this concentration, exactly what might be expected to happen when aggregating to form a micelle.

Figure 6:
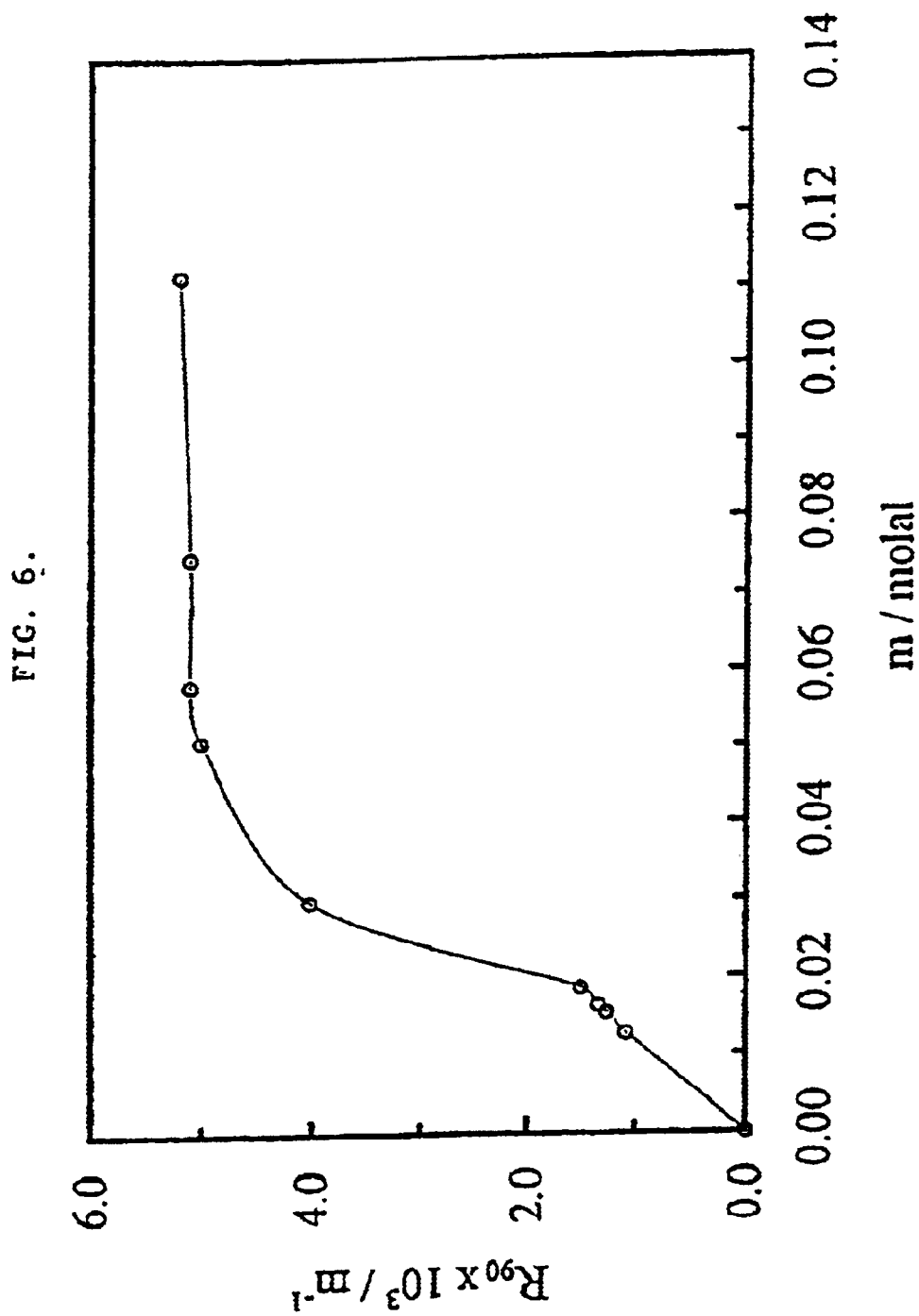
FIG. 6 is a graph showing Rayleigh scattering at 90° of SbQ solutions, at 25° C., as a function of concentration.

Referring to FIG. 6, the sharp increase in scattering which occurs at concentrations approaching 0.04M indicates the appearance of larger particles i.e. micelles.

Figure 7:
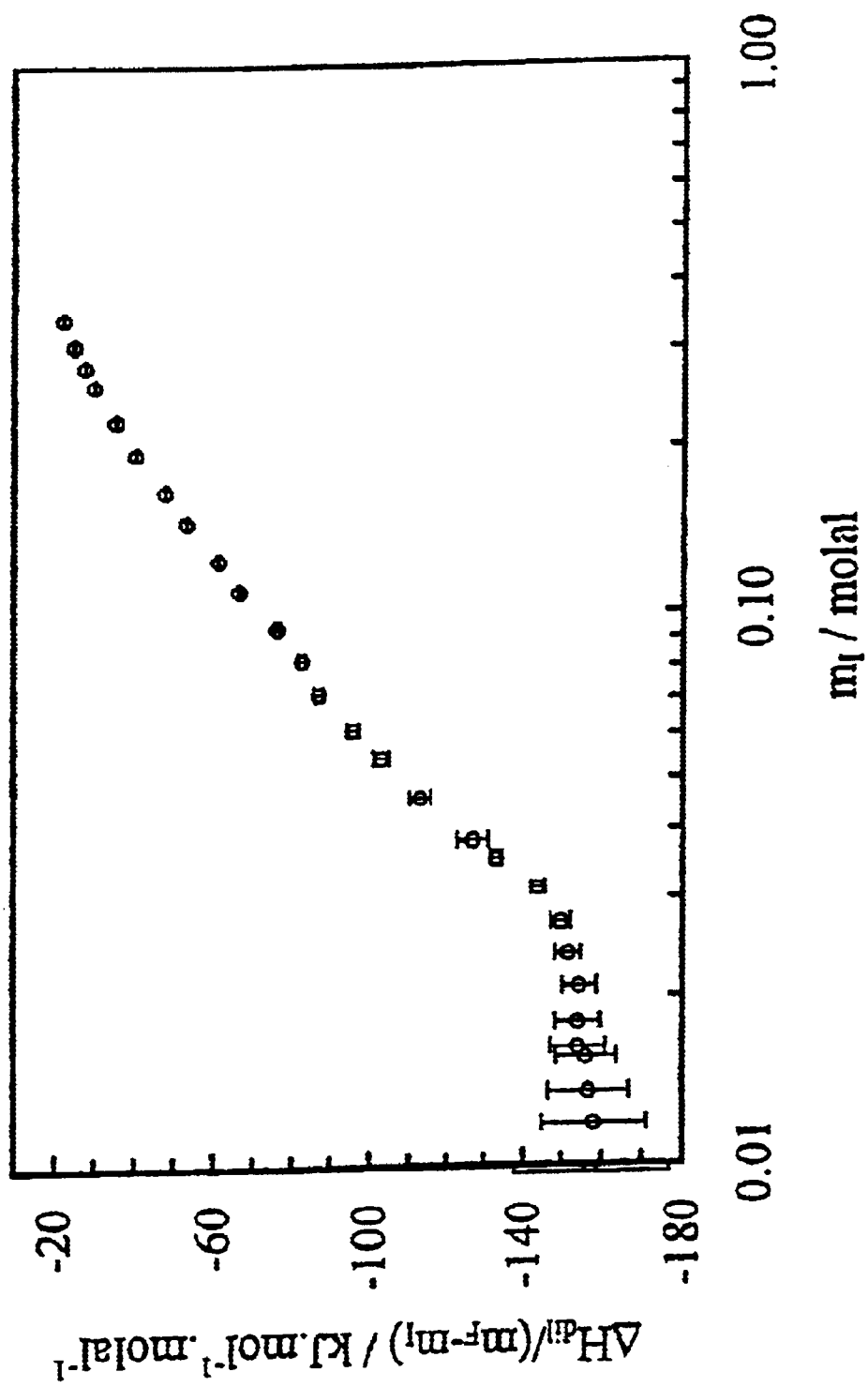
FIG. 7 is a graph showing heats of dilution of SbQ solutions, at 25° C., as a function of concentration.

Referring to FIG. 7, the heats of dilution measurements also show a sharp change of slope, in this case at 0.035M, yet again indicating a major change in the solution state of the solute, from monomer to micelle has occurred.

It should be appreciated from the above that the close correlation between the concentration dependence behaviour of all the experimental measurements is good confirmation of the existence of a monomer-micelle equilibrium in the aqueous solutions of SbQ. This behaviour is utilised in the following examples.

EXAMPLE 1

Preparation of poly(1,4-di(4-(N-methylpyridinyl))-2,3-di(4-(1-formylphenyl)butylidene (Compound II Shown Below)

An aqueous solution of greater than 1 wt % SbQ was exposed to ultraviolet light. This results in a photochemical reaction between the carbon—carbon double bonds of adjacent 4-(4-formylphenylethenyl)-1-methylpyridinium methosulphate molecules (I) in the aggregate, producing a polymer, poly (1,4-di(4-(N-methylpyridinyl))-2,3-di(4-)1-formylphenyl) butylidene (II), as shown in the reaction scheme below. It should be appreciated that the anions of compounds I and II have been omitted in the interests of clarity.

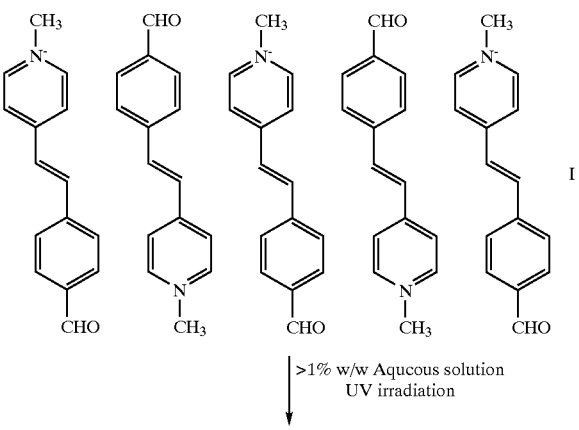

>1% w/w Aqueous solution
UV irradiation

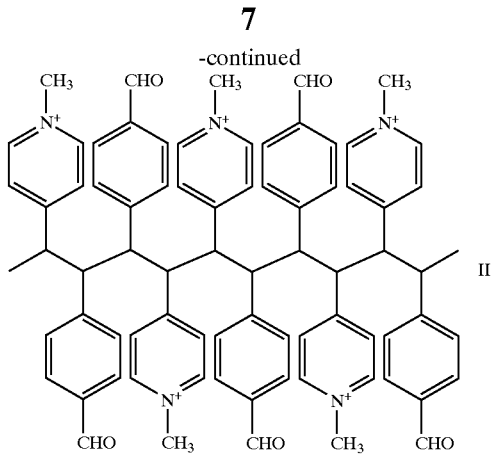

It is believed that polymeric compound II is novel.

EXAMPLE 2

Preparation of Blend Using Compound II

A typical method for the preparation of a gel is outlined below.

13 g of 88% hydrolysed poly(vinyl alcohol) of molecular weight 300,000 was dissolved in 87 g of a 2% w/w solution of compound II. The poly(vinyl alcohol) was added slowly with constant stirring to disperse the powder. Final dissolution was achieved by maintaining the solution at a temperature of 60° C. for a period of 6 hours. The resultant poly(vinyl alcohol)/poly(1,4-di(4-(N-methylpyridinyl-2,3-di(4-(1-formylphenyl)butylidene solution may be cast as a film on PTFE sheet and dried under vacuum. The solid blend is light stable and can be stored in a desiccator until required.

EXAMPLE 3

Preparation of Gel

The film described in Example 2 may be re-dissolved in water together with an acid, for example paratoluene sulphuric acid. This causes an acid catalysed aldol condensation reaction according to the scheme below.

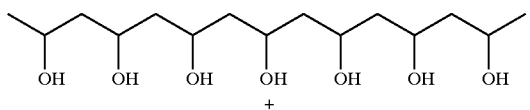

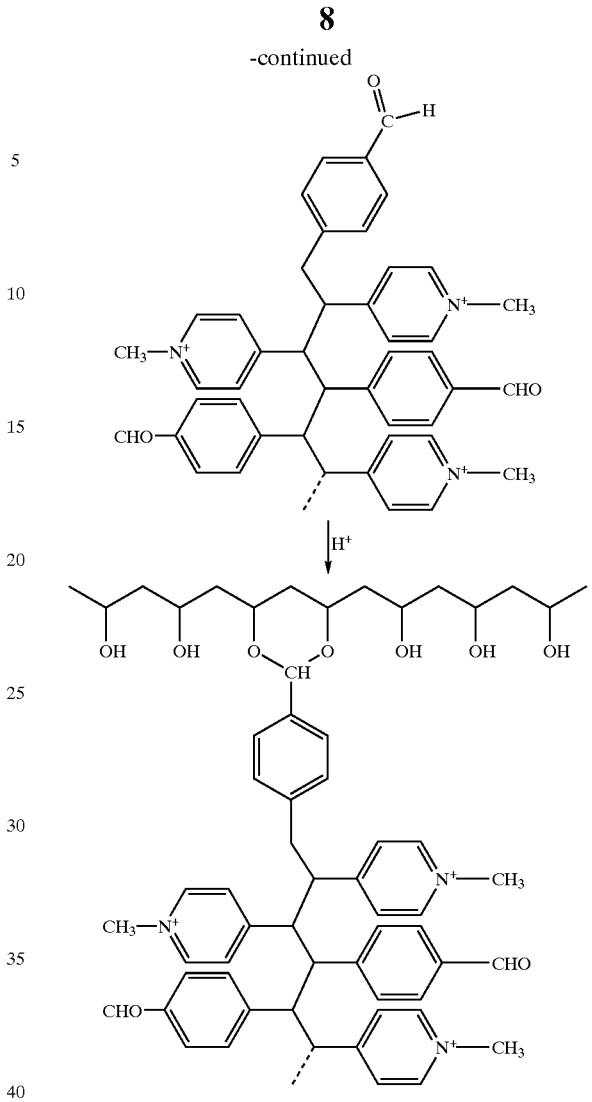

The concentration of film used affects the properties of the resultant gel. For example, rigid gels are formed at concentrations greater than 2.5 wt %. In addition, the gelling time is dependent on the concentration of acid used. 0.1 wt % acid gives a gelling time of 16 hours, whereas 1 wt % acid gives a gelling time of 10 minutes.

Properties of Gels Prepared Following General Procedures Described Herein

1. Gels formed using 2.5 to 13 wt % poly(vinyl alcohol) do not melt or show any visual sign of phase changes on heating to 100° C.; at higher temperatures the gel "chars" but does not burn.
2. The gels are rigid and optically clear.
3. The time required for gelation can be controlled by varying the concentration of acid used to catalyse the gelling reaction. The variable gel time permits the casting of different shapes of gel merely by pouring the reaction mixture into a mould. There is no significant shrinkage of the material on gel formation.
4. The gels are insoluble in all common organic solvents, although some gels swell slightly. The gels are also insoluble in aqueous solutions.
5. Rigid gels can be produced using a mixture of 50 wt % collagen and 50 wt % poly(vinyl alcohol) instead of only poly(vinyl alcohol) described in Examples 2 and 3. The gels produced show resistance to organic solvents and limited swelling in water.

6. After addition of the acid to catalyse the gelling reaction in Example 3, up to 50 wt % oil may be emulsified by the reaction mixture. The resultant gel which is formed holds the oil in a solid matrix.

7. Gels can be produced using solvent mixtures containing up to 50 wt % polypropylene glycol 400. The swelling behaviour of the resultant gels in water is controlled by the amount of polypropylene glycol in the solvent.

8. At concentration less than 2 wt % visco-elastic solutions are produced, wherein viscosity is enhanced tenfold when compared with the unreacted mixture. This behaviour has a potential for use in tertiary oil recovery, wherein the reacting mixture can be pumped into fissures in an oil well and as the reaction proceeds, the visco-elastic properties of the cross-linked polymer solution increase thus holding the fissures open.

All the gels of Examples 1 to 3 and as described above may be rapidly destroyed by the process of periodate splitting of the ply(vinyl alcohol) chain. The solution produced has low viscosity and is easily washed away with water. In the case of the emulsified oil gel mentioned in 6 above, periodate splitting results in gel destruction so that the oil can be recovered.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of preparing a first polymeric compound comprising the following steps:

(a) providing an aqueous solvent containing a compound having the following formula:

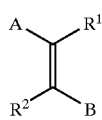

I wherein A is an optionally-substituted aromatic or heteroaromatic group; B is an optionally-substituted aromatic or heteroaromatic group; A and B are the same or different and at least one comprises a polar atom or group, $R^1$ and $R^2$ independently comprise a non-polar atom or group; and (b) causing the groups C=C in said compound I to react with one another to form said polymeric compound.

2. The method of 1, wherein said compound I is in said solvent at a concentration at which molecules of said compound I aggregate.

3. The method of claim 1, wherein the groups C=C in said compound I are caused to react in a photochemical reaction.

4. The method of claim 1, wherein molecules of said compound I form aggregates or micelles in said solvent with the C=C bonds aligned with one another so that the molecules of said compound I are substantially parallel to one another.

5. The method of claim 1, wherein molecules of said compound I align with groups A and B adjacent to one another.

6. The method of claim 1, wherein A and B are different, are selected from optionally-substituted aromatic and heteroaromatic groups and at least one comprises a relatively polar atom or group and $R^1$ and $R^2$ independently comprise relatively non-polar atoms or groups.

7. The method of claim 1, wherein A and B are different.

8. The method of claim 1, wherein one of groups A and B comprises a substituent which is an alkyl group.

9. The method of claim 1, wherein one of groups A and B comprises a substituent which comprises a carbonyl or acetal group.

10. The method of claim 1, wherein A is a phenyl group substituted by a formyl group or a group having the following formula:

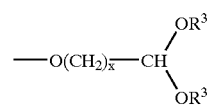

II where x is an integer from 1 to 6 and each $R^3$ is independently an alkyl or phenyl group or together from an alkalene group.

11. The method of claim 1, wherein B has the following formula:

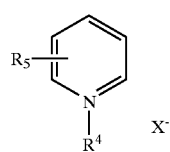

III wherein $R^4$ represents a hydrogen atom or an alkyl or aralkyl group, $R^5$ represents a hydrogen atom or an alkyl group and X represents a strongly acid ion.

12. The method of claim 1, wherein $R^1$ and $R^2$ are independently selected from a hydrogen atom or an optionally-substituted alkyl group.

* * * * *